(12) United States Patent  
Otani et al.

(10) Patent No.: US 8,280,630 B2
(45) Date of Patent: Oct. 2, 2012

(54) NAVIGATION DEVICE (75) Inventors: Kinya Otani, Shijonawate (JP); Ikunori Hisada, Shijonawate (JP); Yuta Taguchi, Hirakata (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 142 days.

(21) Appl. No.: 12/679,584

(22) PCT Filed: Sep. 19, 2008

(86) PCT No.: PCT/JP2008/066954
§ 371 (c)(1),
(2), (4) Date: Mar. 23, 2010

(87) PCT Pub. No.: WO2009/041354
PCT Pub. Date: Apr. 2, 2009

(65) Prior Publication Data
US 2010/0198501 A1     Aug. 5, 2010

(30) Foreign Application Priority Data
Sep. 28, 2007 (JP) .................................. 2007-254353

(51) Int. Cl.
*G01C 21/34* (2006.01)
(52) U.S. Cl. ........................................ 701/455; 701/457
(58) Field of Classification Search .................. 701/212, 701/437, 455, 457
See application file for complete search history.

(56) References Cited
U.S. PATENT DOCUMENTS
5,982,368 A * 11/1999 Toffolo et al. ................ 715/835
(Continued)

FOREIGN PATENT DOCUMENTS
JP        7-160996 A     6/1995
(Continued)

OTHER PUBLICATIONS
International Search Report of PCT/JP2008/066954, mailing date of Oct. 14, 2008.
(Continued)

*Primary Examiner* — Mary Cheung
*Assistant Examiner* — Michael D. Lang
(74) *Attorney, Agent, or Firm* — Westerman, Hattori, Daniels & Adrian, LLP (57) ABSTRACT

A navigation device is provided that presents a travel direction of a vehicle at a guide point along with a map around the vehicle, without significantly reducing a display area of the map around the vehicle. The navigation device of the present invention includes current position locating means 9 for locating the current position of a vehicle, storage means 25 for storing map data, display means 19 for displaying a guidance screen that includes a map 41 around the current vehicle position with use of the map data, and operation means formed by a plurality of keys 45, 49, 65, 67 and 69 displayed on the display means 19 and a touch panel 31. The guidance screen includes a guide point display key 49, the guide point display key 49 causing a map 41 around a guide point that the vehicle is to pass through next, out of guide points that are present on the guidance route and where a travel direction of the vehicle is guided, to be displayed on the display means 19 instead of the guidance screen, and an arrow 51 is added to the guide point display key 49, the arrow 51 indicating the travel direction of the vehicle at the guide point that the vehicle is to pass through next.

5 Claims, 8 Drawing Sheets

U.S. PATENT DOCUMENTS

| | | | |
|---|---|---|---|
| 2005/0149262 A1 | 7/2005 | Oikubo | |
| 2005/0177304 A1* | 8/2005 | Tu | 701/211 |
| 2005/0278115 A1* | 12/2005 | Okada | 701/212 |
| 2006/0031005 A1* | 2/2006 | Sakano et al. | 701/200 |

FOREIGN PATENT DOCUMENTS

| | | |
|---|---|---|
| JP | 8-128839 A | 5/1996 |
| JP | 11-281386 A | 10/1999 |
| JP | 2001-330463 A | 11/2001 |
| JP | 2002-107169 A | 4/2002 |
| JP | 2004-085329 A | 3/2004 |
| JP | 2004-309224 A | 11/2004 |
| JP | 2004-340825 A | 12/2004 |
| JP | 2005-043157 A | 2/2005 |
| JP | 2006-208293 A | 8/2006 |
| JP | 2006-214980 A | 8/2006 |

OTHER PUBLICATIONS

Notification of Trasmittal of Translation of the International Preliminary Report on Patentability (Form PCT/IB/338) of International Application No. PCT/JP2008/066954 mailed May 14, 2010 with Forms PCT/IB/373 and PCT/ ISA/237.

* cited by examiner

NAVIGATION DEVICE

TECHNICAL FIELD

The present invention relates to a navigation device that guides the travel of a vehicle along a guidance route leading to the destination, and more specifically, a navigation device that guides the travel direction of a vehicle at intersections on the guidance route.

BACKGROUND ART

One of main functions of a navigation device mounted in a vehicle is a function of providing a driver with guidance such as turning right, turning left or traveling straight at intersections and forks in the road while guiding the travel of the vehicle in accordance with the guidance route. Normally, such guidance is provided when the vehicle has approached a guide point such as an intersection, by providing audio guidance informing the travel direction such as tuning right or left, as well as visually showing the driver the travel direction through the screen.

While various forms are employed for the screen displayed on the navigation device when guiding the travel direction, they are common in that an arrow indicating the travel direction of the vehicle is displayed. For example, the navigation device disclosed in JP 2006-208293A, on determining that the vehicle has approached a guide point on the guidance route, displays an enlarged map of the area around the guide point in which an arrow indicating turning right or left is shown, in addition to a map around the current position of the vehicle.

DISCLOSURE OF INVENTION

Problems to be Solved by the Invention

With conventional navigation devices such as that disclosed in JP 2006-208293A, until the vehicle approaches a guide point, the driver has no way of knowing the travel distance from the current vehicle position to the guide point, details of the travel direction at the guide point (i.e., turning right or left), or the geography around the guide point. Displaying information on the guide point when the vehicle has approached the guide point is preferable in terms of displaying information at an appropriate time. However, such display is not necessarily preferable in all situations. For example, in the case of a heavy traffic jam over a long distance where lane changing is not easy, even if the vehicle is far from the guide point, it is preferable that the driver knows the distance between the vehicle and the guide point, and the travel direction at the guide point. Consequently, it is possible to change the travel lane of the vehicle to an appropriate lane for steering at the guide point well in advance.

Accordingly, it is conceivable to cause the navigation device to always display guidance information of the guide point that the vehicle is to pass through next (on the guidance route) along with the map around the vehicle (the guide point that the vehicle is to pass through next and the guidance information thereof change from time to time as the vehicle travels). However, dividing the screen into two areas and always displaying the map around the guide point in one of the areas impairs the function of guiding the guidance route, and therefore is not practical. Therefore, a configuration is more preferable in which the map around the guide point is displayed (or hidden) based on the driver's instruction.

Many navigation devices use as operation means so-called software keys using a touch panel, that is, GUI (Graphical User Interface), whereby the navigation device receives inputs and instructions as a result of the driver pressing a touch panel region that is displayed on a display portion and that corresponds to graphics representing keys or buttons. When such a navigation device adopts a configuration in which guidance information of the guide point that the vehicle is to pass through next is always displayed, and the map around the guide point is displayed upon instruction from the driver, a key for instructing to display the map around the guide point (a graphic representing a key) will be simultaneously displayed on the display portion, along with the map around the vehicle and information on the travel direction at the guide point. However, if a large area on the screen is occupied for displaying the key and the information on the travel direction, the display area for the map around the vehicle, which is the most important information on the screen displayed during guide operation, is reduced.

The present invention solves the above problems, and provides a navigation device showing the travel direction of the vehicle at the guide point along with the map around the vehicle, while avoiding reducing the display area of the map around the vehicle as much as possible.

Means for Solving the Problems

The navigation device of the present invention is a navigation device for guiding travel of a vehicle in accordance with a guidance route, including current position locating means for locating a current position of the vehicle, storage means for storing map data, display means for displaying a guidance screen that includes a map around the current vehicle position with use of the map data, and operation means formed by a key displayed on the display means and a touch panel, wherein the guidance screen includes a guide point display key that causes a map around a guide point that the vehicle is to pass through next, out of guide points on the guidance route that are for guiding a travel direction of the vehicle, to be displayed on the display means, and the guide point display key has added thereto an arrow indicating the travel direction of the vehicle at the guide point that the vehicle is to pass through next.

Further, with the navigation device of the present invention, in a case where the guide point that the vehicle is to pass through next is included in the map around the current vehicle position, the guide point display key is deactivated.

Further, with the navigation device of the present invention, a scale of the map around the current vehicle position can be selected from among a plurality of values, and in a case where the scale of the map around the current vehicle position is a predetermined value or smaller, the guide point display key is activated even if the guide point that the vehicle is to pass through next is included in the map around the current vehicle position.

Further, with the navigation device of the present invention, the map around the guide point that the vehicle is to pass through next includes two keys, the two keys constituting the operation means together with the touch panel, and one of the keys being for increasing the scale of the map, and the other being for decreasing the scale of the map.

Effect of the Invention

With the navigation device of the present invention, a guide point display key functions also as means for informing the driver of the travel direction at the guide point, as a result of an arrow indicating the travel direction at the guide point that the vehicle is to pass through next being added to the guide point display key for causing the map around the guide point that the vehicle is to pass through next to be displayed on display means. In this manner, guidance on the travel direction at the guide point is visually provided to the driver together with presentation of the map around the vehicle, without significantly reducing the display area of the map around the vehicle.

With the navigation device of the present invention, when the guide point that the vehicle is to pass through next is included in the map around the current vehicle position, the guide point display key is deactivated. Therefore, an unnecessary operation in which map changing processing is carried out despite the guide point being included in the map on the guidance screen can be eliminated. When the scale of the map on the guidance screen is selectable, the smaller the scale of the map, the harder it is for the driver to distinguish the position of the guide point instantly. Therefore, in the case where the scale of the map on the guidance screen is a predetermined value or smaller, it is preferable to activate the guide point display key even if the guide point is included in the map. In addition, with the navigation device of the present invention, it is possible for the driver to change the map around the guide point into a more detailed map when he or she desires to know details around the guide point, by making it possible to change the scale of the map around the guide point with operation means. Also, in the case in which the scale of the map around the guide point is too large and the driver desires to find out about a wider area around the guide point, the driver can change the map around the guide point to a map covering a wider area.

EXPLANATION OF REFERENCE NUMBERS (1) Control portion
(9) GPS receiver
(17) Rendering portion
(19) Display portion
(25) Recording medium
(31) Touch panel
(41) Map
(49) Guide point display key
(51) Arrow
(61) Map
(65) Return key
(67) Up key
(69) Down key

BEST MODE FOR CARRYING OUT THE INVENTION

Figure 1:
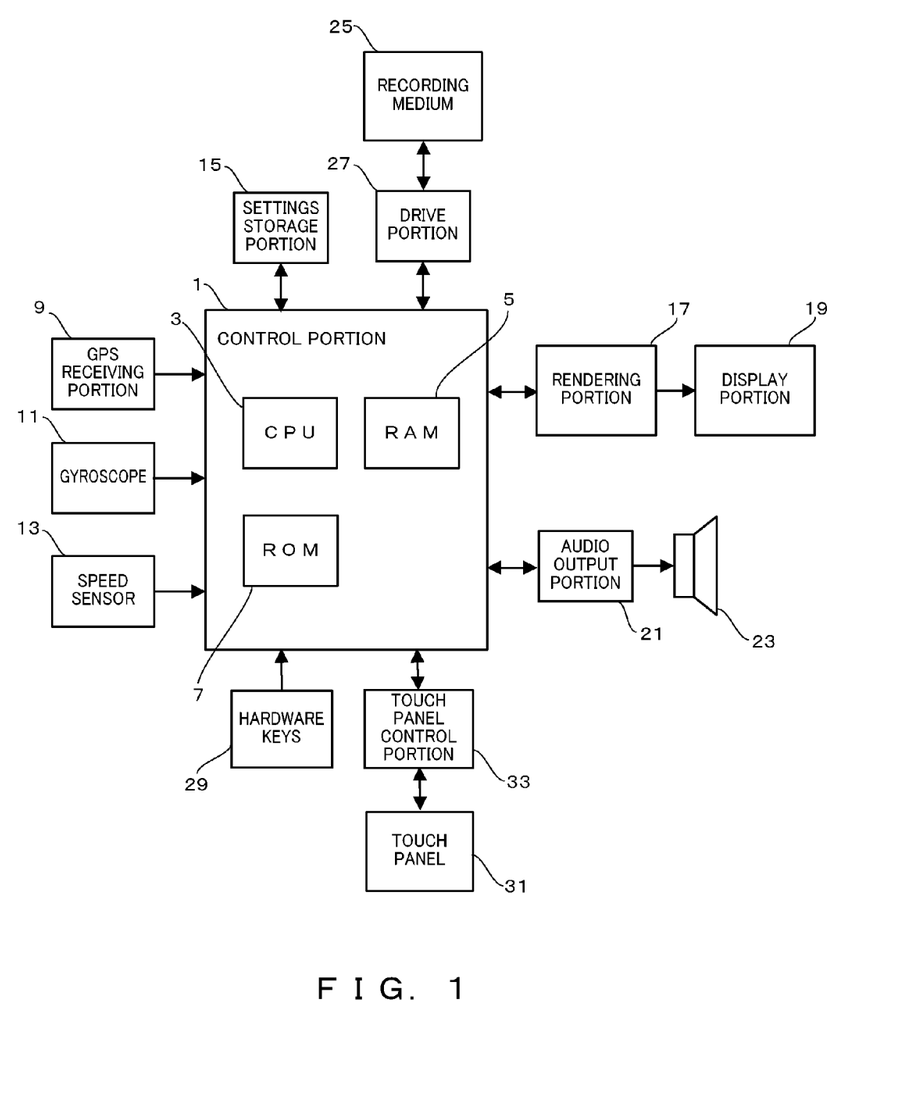
FIG. 1 is a block diagram of a navigation device according to an embodiment of the present invention.

Hereinafter, the present invention will be described with reference to attached drawings. FIG. 1 is a block diagram of a in-vehicle navigation device according to an embodiment of the present invention. A control portion (1) performs overall control of the navigation device and executes various processes for executing functions of the navigation device. The control portion (1) is a microcomputer for example, and includes a CPU (3) that performs various operations and executes various programs including a program describing a guide operation described below, a RAM (5) that temporarily stores programs executed by the CPU (3) or data to be used by the CPU (3), and a ROM (7) that stores a boot program executed when the device is powered on, and the like.

A GPS receiver (9) is constituted by a GPS LSI for example, and includes a receiving circuit for receiving GPS signals from GPS satellites via a GPS antenna (not shown), a logic circuit that processes received GPS signals so as to demodulate data to be used for a position operation, and the like. Data demodulated by the GPS receiver (9) is transmitted to the control portion (1). A gyroscope (11) detects the azimuth of the vehicle and transmits azimuth data to the control portion (1). A speed sensor (13) detects the vehicle speed and transmits speed data to the control portion (1). The control portion (1) uses data demodulated by the GPS receiver (9), azimuth data from the gyroscope (11), and speed data from the speed sensor (13), thereby calculating the current vehicle position. A settings storage portion (15) is a rewritable non-volatile storage medium using a flash memory or SRAM, for example, and stores therein various settings set by the user, for example.

A rendering portion (17) generates image data for the screen displayed on a display portion (19) based on commands, rendering data or the like transmitted from the control portion (1). The rendering portion (17) is, for example, constituted by a rendering LSI, and includes a graphics processor that executes rendering processing, a graphics memory that stores image data generated by rendering processing, and a display controller that generates image signals to be transmitted to the display portion (19) based on the image data stored in the graphics memory (all of which are not shown). A liquid crystal display device, for example, is used as the display portion (19).

The screen displayed on the display portion (19) has a layered structure, and is constituted by superimposing a first layer for expressing the map of the guidance screen displayed during a guide operation, the background of the menu screen, and the like, a second layer for expressing a mark that indicates the vehicle position on the guidance screen, a mark that indicates the position of the guide point, and the like, and a third layer for expressing various keys provided in the guidance screen, menu screen and the like. The graphics processor of the display portion (19) generates image data for these layers based on the commands and data from the control portion (1), and the display controller outputs image signals for displaying screens of these layers in a superimposed manner to the display portion (19), based on the generated image data.

An audio output portion (21) is constituted by a voice synthesis LSI, an amplifier and the like, and generates voice signals for voice produced by the navigation device, such as a voice guiding turning right or left. The voice signals generated by the audio output portion (21) are reproduced with a speaker (23).

A recording medium (25) is a hard disk, memory card, DVD or CD-ROM, for example, and stores map data, and programs describing procedures for the guide operation and other operations of the in-vehicle navigation device (such programs may be stored in the ROM (7) of the control portion (1), or other storage means). The map data and programs are read out via a drive portion (27) and transmitted to the control portion (1).

The map data includes information on a plurality of maps of different scales. In the present embodiment, information on 1:5000 (1 cm on the map equivalent to 50 m), 1:10000 (1 cm on the map equivalent to 100 m), 1:20000, 1:40000, 1:80000, 1:160000, 1:320000, 1:640000, 1:1280000, 1:2560000, 1:5000000, 1:10000000 and 1:20000000 (1 cm on the map equivalent to 200 km) maps is included. In this specification, "map of a small scale" indicates that the denominator of the map scale is large (i.e., the scale of a 1:20000 map is smaller than that of a 1:10000 map).

The map data has a layered structure for each scale. In each layer, the map data is sectioned into and managed in predetermined geographic regions (i.e., rectangular regions). The map data includes, for each of the sectioned regions, road data relating to nodes and links that describes the road network, geographical data relating to the road shape, terrain features, and the like, and character/symbol data relating to prefecture names, road names and the like. The road data includes information, for each node, on the latitude and longitude, node attributes (for example, an intersection or road end), links to which the node belongs, and the like. The road data also includes information, for each link, on the road attributes (for example, one-way street or slope), link distance, azimuth, and the like. The road data also includes information on the structure of nodes and links at each intersection included in each sectioned region. The description of the road network in the road data becomes more detailed from the upper layer to the lower layer.

The operation means of the navigation device includes hardware keys (29) such as a power key, and software keys formed with a touch panel (31) and key-shaped graphics displayed on the display portion (19). The touch panel (31) is, for example, a resistive touch panel, and is arranged so as to cover the display area of the display portion (19). The touch panel control portion (33) is, for example, a control IC, and controls voltages applied to various electrodes of the touch panel (31). In addition, the touch panel control portion (33) calculates the X-coordinate value and Y-coordinate value of the pressed location with the use of the potentials corresponding to the X-coordinate and Y-coordinate of the location pressed by the user, and transmits the values to the control portion (1). For each of the graphics representing the keys, detection ranges for the X-coordinate and Y-coordinate that cover the graphic (when displayed on the display portion (19)) are set in the control portion (1) (settings of the detection ranges are stored in the ROM (7), for example). When the touch panel (31) is pressed, the control portion (1) identifies the key that has been pressed based on the coordinate values transmitted from the touch panel control portion (33) and the set detection range, and executes operations and processing corresponding to the pressed key. When the coordinate values transmitted from the touch panel control portion (33) do not fall within any of the set detection ranges, the control portion (1) does not perform any processing or operation even if the touch panel (31) is pressed.

Figure 2:
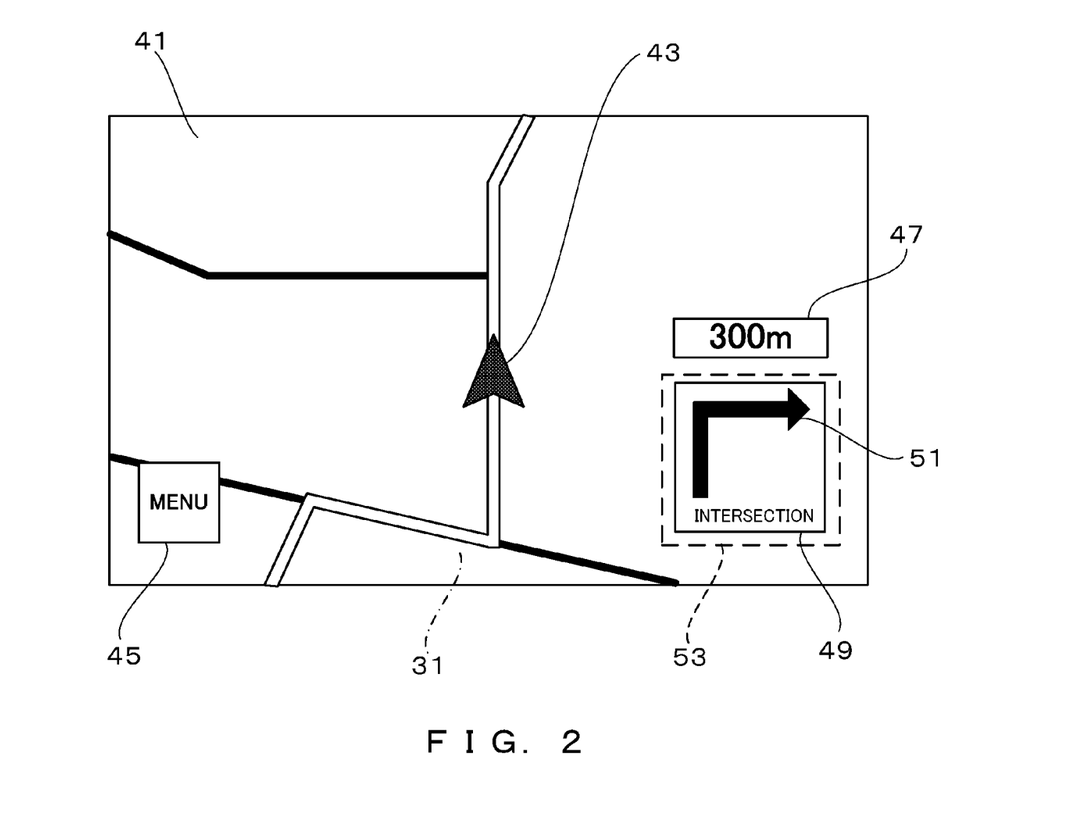
FIG. 2 is an example of a guidance screen that the navigation device of the embodiment of the present invention displays.

FIG. 2 illustrates an example of the guidance screen displayed on the display portion (19) during the guide operation by the navigation device. The guidance screen includes a map (41) around the current vehicle position, a mark (43) that indicates the current vehicle position and the travel direction, a menu key (45) for switching the display to the menu screen, a character string (47) that indicates the distance from the current vehicle position to the guide point that the vehicle is to pass through next (on the guidance route), and a guide point display key (49) for displaying the map around the guide point that the vehicle is to pass through next. The map (41) shows a rectangular region centered on the current vehicle position, in which the guidance route (indicated by a white line) is visually and clearly distinguished from other roads irrelevant to the guidance route (indicated by solid lines).

The menu key (45), the character string (47) and the guide point display key (49) are displayed overlapping the map (41). Although the menu key (45) and the guide point display key (49) are rendered in a substantially square graphic, the area of the guide point display key (49) is set larger than that of the menu key (45), and in the guide point display key (49), an arrow (51) for guiding the travel direction at the guide point that the vehicle is to pass through next, and a character string indicating that the guide point is an intersection are shown. In the example shown in FIG. 2, the character string (47) indicates that a guide point is "300 m" ahead of the current vehicle position, and the arrow (51) turning to right indicates that the travel direction for the vehicle at that guide point is rightward, specifically, that the vehicle is to turn right at the guide point, and the character string in the guide point display key (49) indicates that the guide point is an intersection. The touch panel (31) is provided above the guidance screen displayed on the display portion (19) (i.e. on the display area of the display portion (19)), and in the control portion (1), a detection range (53) corresponding to the guide point display key (49) is set so as to cover the guide point display key (49) (this is applicable to the menu key (45), and a below-described return key (65), up key (67) and down key (69)).

Figure 3:
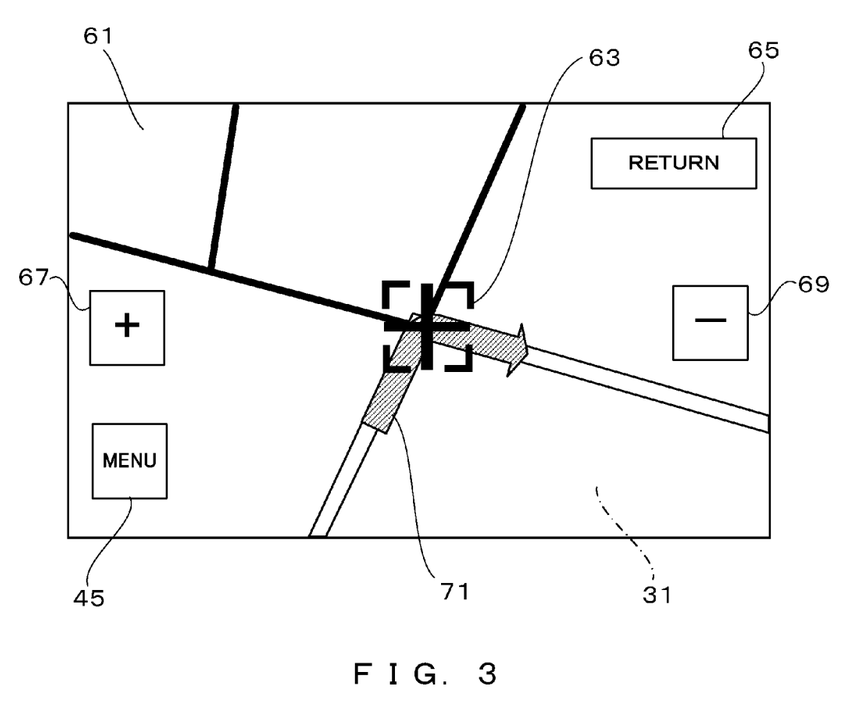
FIG. 3 is an example of a map around a guide point that the navigation device of the embodiment of the present invention displays.

FIG. 3 is an example of the screen displayed on the display portion (19) when the guide point display key (49) is pressed. In this screen, a mark (63) indicating the position of the guide point, the return key (65) for returning to the guidance screen display, the up key (67), the down key (69) and the menu key (45) are shown on a map (61) around the guide point. The map (61) shows a rectangular region centered on the guide point, in which the guidance route is visually distinguished from roads that are not included in the guidance route, similar to the map (41) on the guidance screen in FIG. 2. Furthermore, an arrow (71) guiding the travel direction at the guide point is also included in the map (61).

The user can freely select the scale of the map (41) on the guidance screen via the setting screen (not shown) of the navigation device (in the present embodiment, the scale of the map (41) can be selected from among thirteen scales ranging from 1:5000 to 1:2000000, as described above), and the selected scale is stored in the settings storage portion (15). In the present embodiment, the scale of the map (61) around the guide point displayed as a result of the guide point display key (49) on the guidance screen having been pressed is set to the same scale as the map (41) on the guidance screen. For example, assuming that the scale of the map (41) on the guidance screen shown as an example in FIG. 2 is 1:10000, the scale of the map (61) shown as an example in FIG. 3 is also set to 1:10000. In the present embodiment, the scale of the map (61) can be changed by pressing the up key (67) or the down key (69). When the up key (67) is pressed, the scale of the map (61) around the guide point is changed to a scale that is next larger than the current scale (the map is enlarged), and when the down key (69) is pressed, the scale of the map (61) around the guide point is changed to a scale that is next smaller than the current scale (the map is reduced).

The first feature of the navigation device of the present embodiment is that, as shown in FIG. 2, the arrow (51) guiding the travel direction at the guide point is included in the guide point display key (49) for displaying the map (61) around the guide point. By employing such a configuration, the guide point display key (49) that functions as operation means also functions as guiding means for steering of the vehicle. As a result, an increase in the graphics region overlapping the map (41) on the guidance screen can be suppressed. If the display area of the arrow (51) is provided separately from the guide point display key (49), the area of the map (41) decreases by the size of the separate display area.

The second feature of the navigation device of the present embodiment is that processing is performed giving consideration to the scale of the map (41) on the guidance screen, and whether or not the guide point is included in the map (41). In a state in which the scale of the map (41) is large, and the guide point that the vehicle is to pass through next is included in the map (41), there is little necessity to display the map (61) around the guide point in response to the pressing of the guide point display key (49). The navigation device of the present invention, in such a state, displays the guide point display key (49), but deactivates the function as a key.

Figure 4:
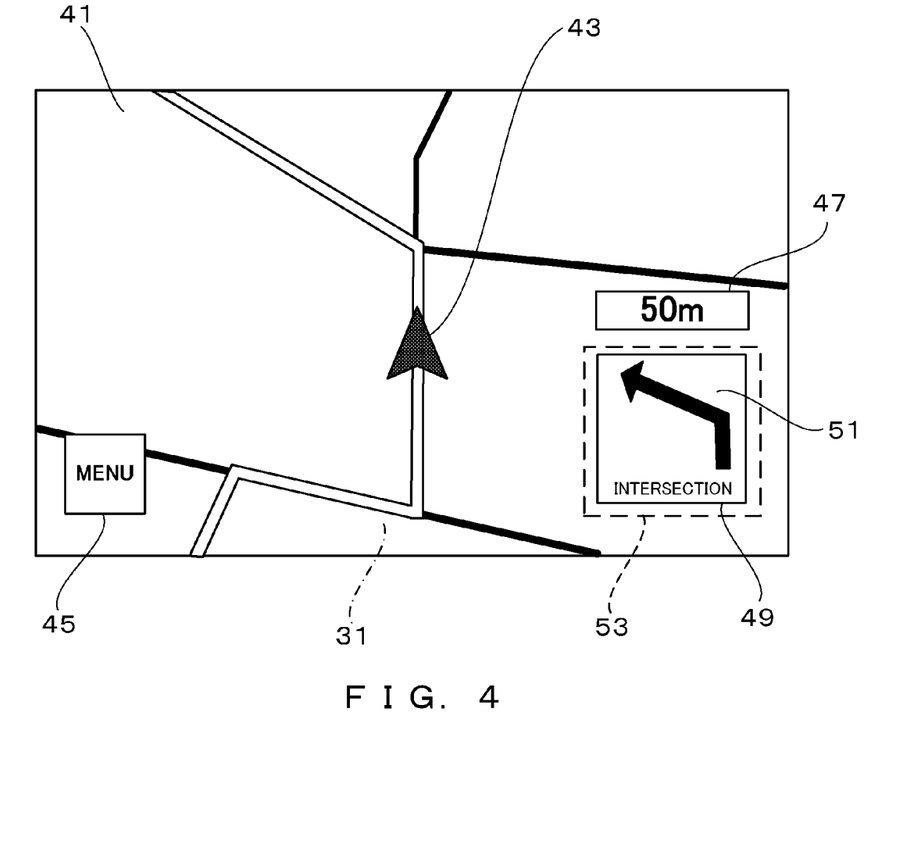
FIG. 4 is an example of the guidance screen that the navigation device of the embodiment of the present invention displays.

For example, on the guidance screen as shown in FIG. 4 (for example, the scale of the map (41) on the guidance screen is assumed to be 1:10000), the guide point that the vehicle is to pass through next, which is an intersection where the vehicle should travel diagonally left, is already shown in the map (41) on the guidance screen. In such a case, the guide point display key (49) is deactivated, and even if the guide point display key (49) is pressed, the guidance screen remains displayed. To the guide point display key (49) is added the arrow (51) turning diagonally left that indicates the travel direction at the guide point is diagonally left, and the guide point display key (49) functions as visual guiding means.

Figure 5:
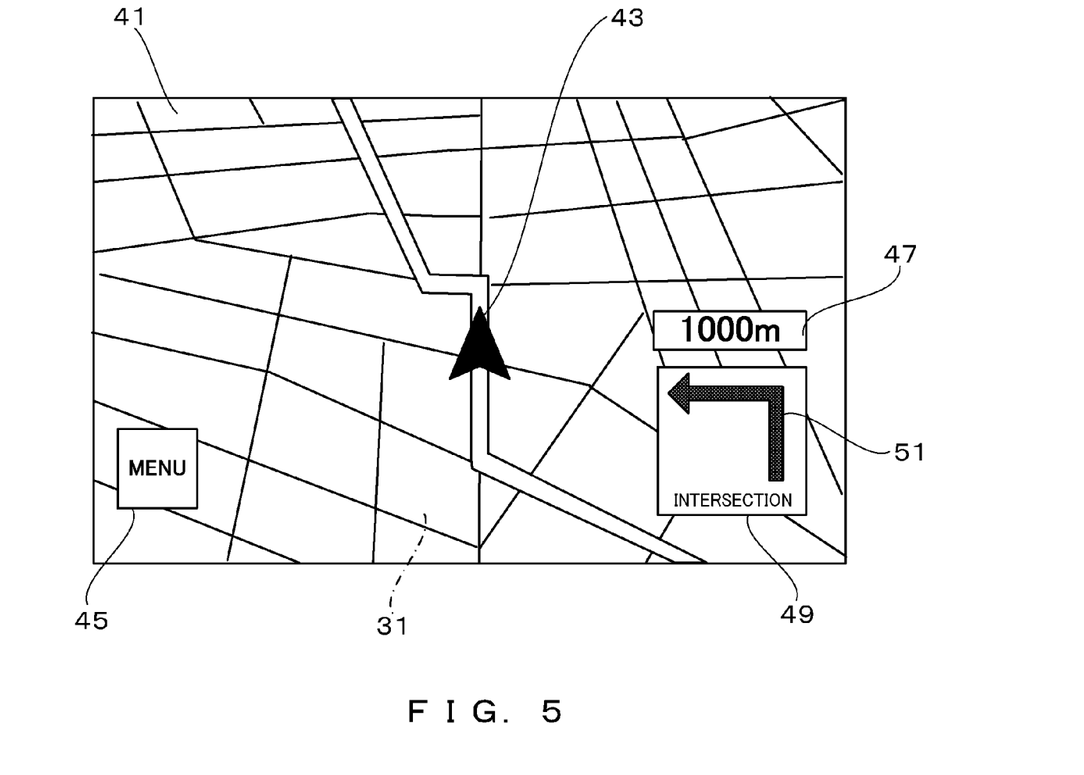
FIG. 5 is an example of the guidance screen that the navigation device of the embodiment of the present invention displays.

Meanwhile, as shown in FIG. 5, when the scale of the map (41) on the guidance screen is small (for example, the scale of the map (41) is assumed to be 1:160000), even if the guide point that the vehicle is to pass through next is included in the map (41), it is comparatively difficult to locate the position thereof instantly (Note that FIG. 5 is merely an illustrative diagram. Symbols indicating facilities, characters indicating place names and the like are present in the map actually displayed. Therefore as the scale becomes smaller, the number of roads, signs or the like increases, making the map complicated). In particular, in the case where the guide point in the map (41) is near the mark (43) indicating the current vehicle position, it is more difficult to locate the guide point instantly. The guide point may be hidden under the mark (43).

Figure 6:
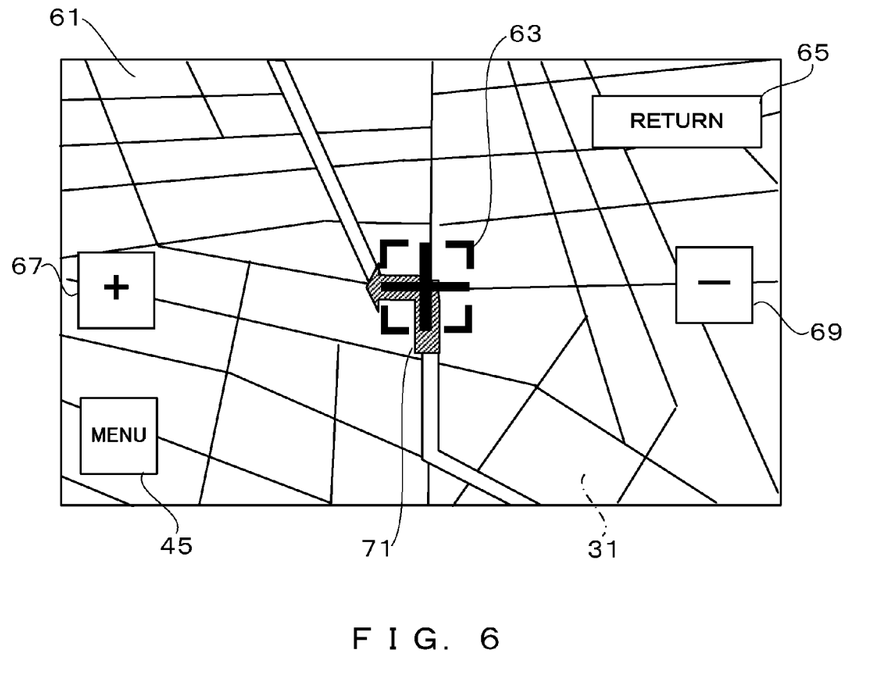
FIG. 6 is an example of the map around the guide point that the navigation device of the embodiment of the present invention displays.

In view of such an issue, the navigation device of the present invention activates the function of the guide point display key (49) when the scale of the map (61) of the guidance screen is a predetermined scale or smaller (1:40000 or smaller, for example) so as to make the map around the guide point in which the guide point is indicated with the mark (63) displayable (regardless of whether the guide point that the vehicle is to pass through next is included in the map on the guidance screen or not). For example, in the map (41) on the guidance screen shown in FIG. 5, the next guide point, which is an intersection where the vehicle should turn left, is located near the mark (43) indicating the current vehicle position. When the guide point display key (49) is pressed, the map (61) around the guide point, such as shown in FIG. 6, which deviates a little from the map (41) in FIG. 5, is displayed. As described above, the scale of the map (61) can be changed by operating the up key (67) and the down key (69). For example, each time the up key (67) is pressed, the scale of the map (61) is increased by one level at a time, so that it is possible to see the detailed conditions around the guide point.

Figure 7:
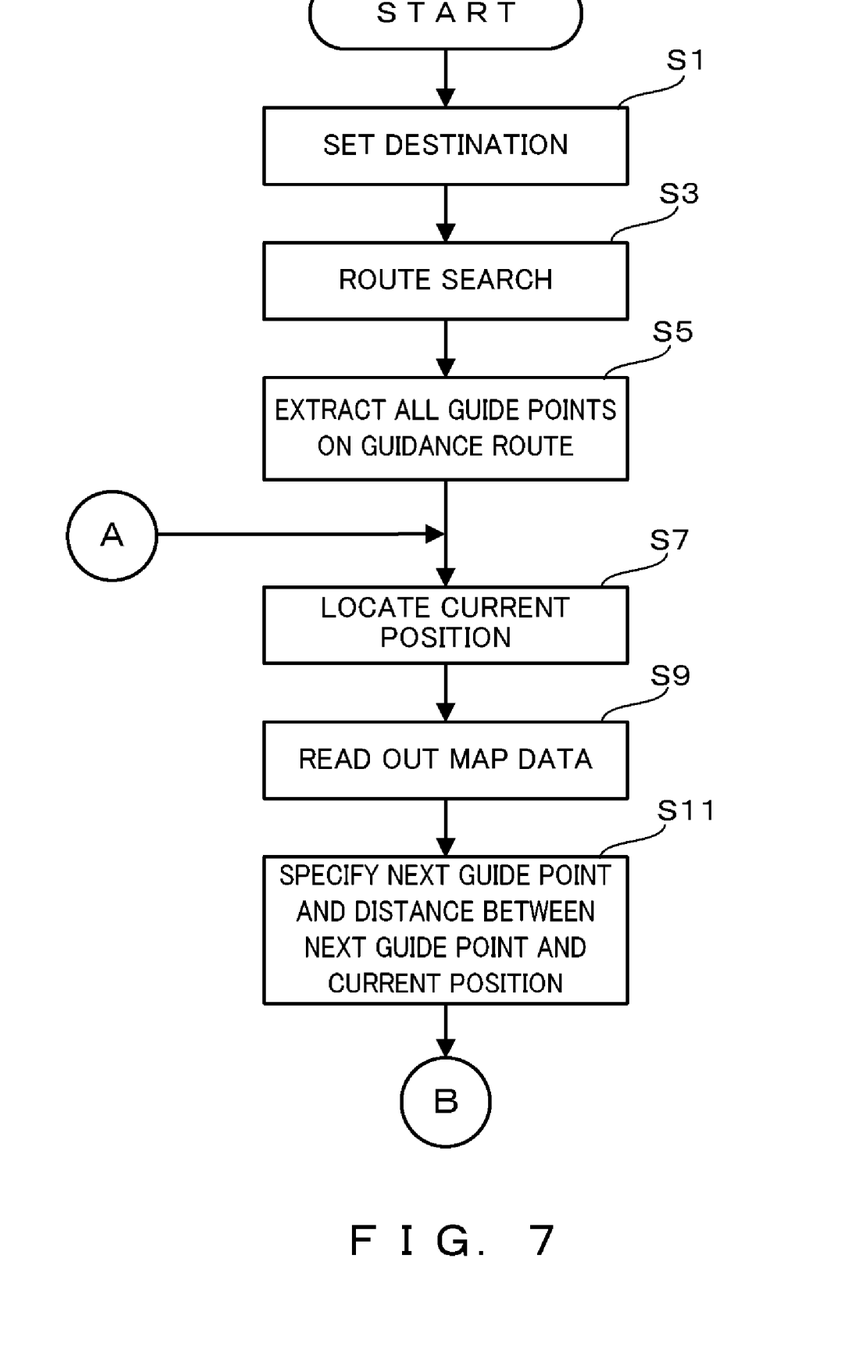
FIG. 7 is a flowchart illustrating a guide operation that the navigation device of the embodiment of the present invention performs.
Figure 8:
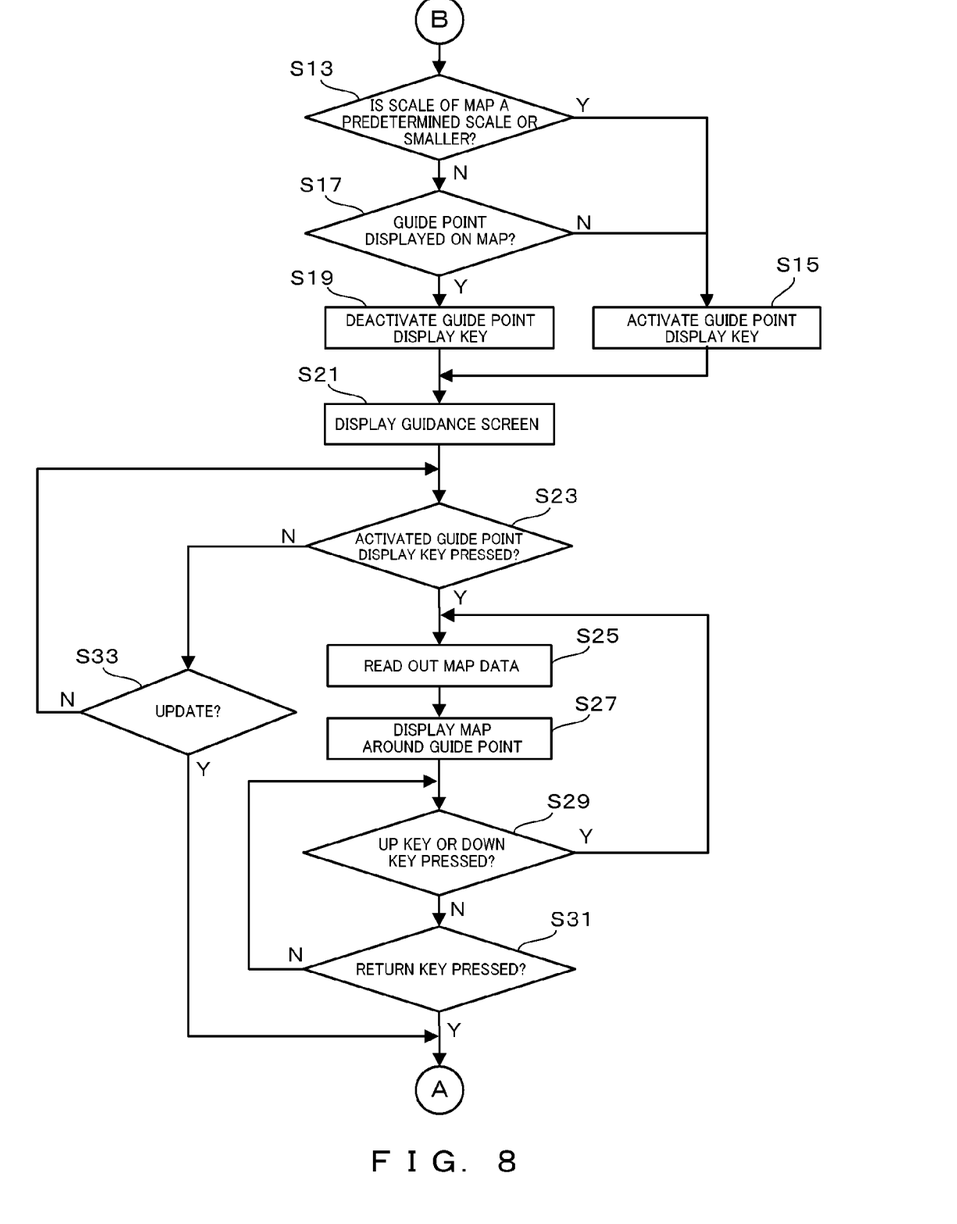
FIG. 8 is a flowchart illustrating a guide operation that the navigation device of the embodiment of the present invention performs.

FIGS. 7 and 8 respectively show a flowchart illustrating the guide operation performed by the navigation device of the present embodiment. The program describing this operation is stored in the recording medium (25), and is loaded to the RAM (5) of the control portion (1) and executed (or, the program may be stored in the ROM (7)). The control portion (1) first performs processing for setting a destination (S1). For example, when an instruction is given by the user via the menu screen, a screen for destination search (not shown) is displayed on the display portion (19). After the user has input search conditions on the destination search screen, a search for the place that satisfies the conditions is carried out, and retrieved places are presented to the user. Then, in response to an instruction or selection by the user, the retrieved place or a place selected from among the retrieved places is set as the destination. The map data stored in the recording medium (25) also includes a database used to search for places, with name, address, telephone number or the like as a search condition. The control portion (1) performs the search with reference to the database, and stores in the RAM (5) the information on the place set as the destination such as the latitude and longitude, name and the like.

After the destination is set, the control portion (1) executes a route search so that the guidance route is determined (S3). In step S3, the control portion (1) calculates the current vehicle position based on the data from the GPS receiver (9) and the like, and executes the route search from the current position to the destination set in step S1. The control portion (1) carries out the route search with reference to the road network data of the map data stored in the recording medium (25), and stores information on the nodes and links forming the guidance route in the RAM (5) as guidance route information. For example, route search is carried out with the Dijkstra Method, and is started from the sectioned region in the lowermost layer that includes a node nearest to the start point and the sectioned region in the lowermost layer that includes a node nearest to the destination. In the route search, the search range shifts to a sectioned region in an upper layer as required, and as a result of the route from the start point and the route from the destination having been connected, a route from the start point to the destination is found. Out of the routes from the start point to the destination, the route having the least cost, such as a route with the shortest travel time or the shortest travel distance, is determined as the guidance route.

When the guidance route is determined as a result of the route search, the control portion (1) extracts all guide points where the travel direction of the vehicle should be indicated to the driver from the guidance route information that has been stored, and stores each of the extracted guide points in association with the corresponding travel direction of the vehicle at each guide point (S5). For example, in step S5, the control portion (1) determines, for each node included in the guidance route, whether or not there is any link, other than the exit link, that can be exited to from the node after traveling along the approach link. The "approach link" used herein refers to a link that exists on the guidance route, and that ends at the node in question, and the "exit link" used herein refers to a link that exists on the guidance route, and that starts from the node in question. Then, the control portion (1) determines, for each node having a link (other than the exit link) that can be exited to, whether the vehicle will travel naturally along the approach link and the exit link, based on the azimuths of the approach link, the exit link and the exit-possible links (in other words, whether or not to guide the travel direction of the vehicle). Furthermore, the control portion (1) specifies, for each node that the vehicle will not naturally travel through along the approach link and the exit link, the travel direction of the vehicle based on the azimuths of the approach link, the exit link, the exit-possible links, and the like, and stores such nodes as guide points together with various information including the travel direction. The travel directions of the vehicle include left, diagonally left, right, diagonally right, u turn, straight, and the like. For example, a node that corresponds to a turnoff on an expressway, where the vehicle exits the expressway if the vehicle travels straight by following the guidance route, is extracted as a guide point, while setting the travel direction of the vehicle as traveling straight.

When all the guide points on the guidance route are extracted, the control portion (1) locates the current vehicle position based on the data from the GPS receiver (9) and the like (S7), and reads out from the recording medium (25) and stores the geographical data and the character/symbol data for rendering the map around the current vehicle position (S9). In step S9, the control portion (1) reads out from the recording medium (25) and stores in the RAM (5), the geographical data and the character/symbol data for the sectioned region that includes the current vehicle position, and, as necessary, the geographical data and the character/symbol data for sectioned regions in the vicinity of the stated sectioned region, these pieces of data being read out from a layer of the map data corresponding to the set scale stored in the settings storage portion (15). In the guide operation, step S9 is repeatedly performed. Reading out the geographical data and the character/symbol data is performed such that new data is added to the data that has been read out in the past as the vehicle drives. Data that is no longer required is deleted from the control portion (1) from time to time.

After step S9, the guide point at the shortest distance (along the guidance route) from the current vehicle position obtained in step S7, that is, the guide point the vehicle is to pass through next is located, and the distance (along the guidance route) between the current vehicle position and the guide point is calculated (S11). For example, in step S11, in addition to the current vehicle position, the distance between the current vehicle position and the guide point is obtained based on the length of the links that form the guidance route.

After step S11, the control portion (1) determines whether or not the set scale of the map is a predetermined scale or smaller (S13). The predetermined scale is assumed to be, for example, 1:40000 (1 cm on the map corresponds to 400 m). In the case where the set scale is the predetermined scale or smaller (for example, 1:40000 or 1:100000), after step S13, the control portion (1) activates the guide point display key (49) (S15). For example, a flag for setting whether the guide point display key (49) is activated or deactivated is stored in the RAM (5) of the control portion (1), and in step S15, the control portion (1) sets the flag to "activate" (for example, the flag is set to "1").

In the case where the set scale exceeds the predetermined scale (for example, 1:10000 or 1:20000), after step S13, the control portion (1) determines whether or not the guide point that the vehicle is to pass through next is included in the map (41) on the guidance screen (displayed in step S21) (S17). On the guidance screen of the navigation device of the present embodiment, the map (41) for a predetermined rectangular range centered on the current vehicle position is displayed. In step S17, the control portion (1) specifies the display range of the map based on the current vehicle position located in step S7, and also determines whether or not the latitude and longitude of the node corresponding to the guide point that the vehicle is to pass through next is included in the scope of the map (41) displayed. In the case where the guide point that the vehicle is to pass through next is not included in the map (41) on the guidance screen, the control portion (1) performs step S15 after step S17. In the case where the guide point is included in the map (41), the control portion (1) performs processing for inactivating the guide point display key (49) after step S17 (for example, the flag is set to "0") (S19).

After step S19, the control portion (1) performs processing for displaying the guidance screen in the display portion (19) (S21). In step S21, the control portion (1) instructs the rendering portion (17) to generate image data for displaying the guidance screen and to output the image signals for the guidance screen to the display portion (19). The control portion (1) transmits data necessary for rendering such as the geographical data and character/symbol data as well as commands for the sectioned region including the current vehicle position (if necessary, sectioned regions in the vicinity of the stated sectioned region) to the rendering portion (17), and the rendering portion (17) generates image data for the map for the sectioned region (or sectioned regions).

In the ROM (7) of the control portion (1), bitmap data for the guide point display key (49) to which is added an arrow indicating that the travel direction is right, bitmap data for the guide point display key (49) to which is added an arrow indicating that the travel direction is diagonally right, bitmap data for the guide point display key (49) to which is added an arrow indicating that the travel direction is left, bitmap data for the guide point display key (49) to which is added an arrow indicating traveling straight and the like are stored. In step S21, the control portion (1) transmits to the rendering portion (17) bitmap data for the guide point display key (49) corresponding to the travel direction specified in step S5 for the guide point that the vehicle is to pass through next (that is, the guide point display key (49) to which is added an arrow showing that travel direction). Furthermore, the control portion (1) transmits to the rendering portion (17) information on the guidance route in the rendering range, font data for the character string (47) indicating the distance to the guide point obtained in step S11, bitmap data for the menu key (45), and the like. The rendering portion (17) generates second layer image data including the line of the guidance route, the mark (43) of the current vehicle position, and the character string (47), and third layer image data that includes the guide point display key (49) and the menu key (45). The rendering portion (17) extracts the first layer image data for the map (41) that includes the current vehicle position from the generated image data of the map, and outputs to the display portion (19) image signals for displaying the first layer to the third layer in a superimposed manner based on the first layer image data to the third layer image data. In the guide operation, step S21 is repeatedly executed. The image data to serve as the basis of the first layer image data for the map (41) that includes the current vehicle position is generated from time to time as the vehicle travels, by deleting a portion that has become unnecessary from the generated image data, and adding thereto a new portion.

When the guidance screen is displayed on the display portion (19) in step S21, the control portion (1) determines whether or not the activated guide point display key (49) (or the menu key (45)) has been pressed (S23). In step S23, when the touch panel (31) has been pressed, the control portion (1) determines whether or not the guide point display key (49) or the menu key (45) has been pressed based on the coordinate values transmitted from the touch panel control portion (33) and the set detection range. Note that processing performed when the menu key (45) is pressed is not illustrated in the flowchart in FIG. 7, since it is not directly involved in the present invention. Description of the processing involving the menu key (45) is omitted in this specification.

In step S23, when the guide point display key (49) has been pressed, the settings (flag) regarding whether the guide point display key (49) is activated or deactivated is referenced, and it is determined whether or not the guide point display key (49) in the activated state has been pressed. In the case where the activated guide point display key (49) has been pressed (specifically, in the case where the guide point display key (49) is pressed with the flag set to "1"), after step S23, the rendering portion (17) reads out from the recording medium (25) and stores the geographical data and the character/symbol data for the sectioned region that corresponds to the set scale stored in the settings storage portion (15) and that includes the targeted guide point (S25). Note that, for example, in the case where data of a sectioned region other than the sectioned region that includes the targeted guide point is required in order to display the map around that guide point, such as the case in which an intersection as the guide point is located at an end of the sectioned region, the data of such other sectioned regions is also read out.

After step S25, the control portion performs processing for displaying the map (61) around the guide point in the display portion (19) (S27). The control portion (1) instructs the rendering portion (17) to generate image data for displaying a screen including the map (61) around the guide point and to output image signals for the screen to the display portion (19). In step S27, the control portion (1) transmits to the rendering portion (17) data necessary for rendering such as the geographical data and the character/symbol data that have been read out and commands, and the rendering portion (17) generates image data for the map including the guide point. Furthermore, the control portion (1) also transmits to the rendering portion (17) information on the travel direction at the guide point, information on the guidance route in the rendering range, bitmap data for the mark (63) indicating the guide point, bitmap data for the return key (65), up key (67) and down key (69), and the like. Then, the rendering portion (17) generates the second layer image data that includes the line of the guidance route, the mark (63) of the guide point, the arrow (71) indicating the travel direction and the like, and the third layer image data that includes the menu key (45), return key (65), up key (67) and down key (69), and also extracts from the generated image data for the map, the first layer image data for the map (61) that includes the guide point, and outputs image signals for displaying these layers in a superimposed manner to the display portion (19).

After step S27, the control portion (1) determines whether or not the up key (67) or the down key (69) has been pressed (S29), and further determines whether or not the return key (65) has been pressed (S31). When the up key (67) or the down key (69) is pressed, steps S25 and S27 are performed again, so that a map (61) whose scale has been changed by one level relative to the scale used for the current display is displayed. When the up key (67) is pressed, the control portion (1) reads out from the recording medium (25) the geographical data and the character/symbol data for the sectioned region that is included in the layer of map data corresponding to the scale that is one-level larger than the scale of the map (61) currently displayed, and that includes the guide point to be displayed (as required, such data for sectioned regions around the stated sectioned region), and instructs the rendering portion (17) to render the map (61). When the down key (69) is pressed, the control portion (1) reads out from the recording medium (25) the geographical data and the character/symbol data for the sectioned region that is included in the layer of map data corresponding to the scale that is one-level smaller than the scale of the map (61) currently displayed, and that includes the guide point to be displayed (as required, such data for sectioned regions around the stated sectioned region), and instructs the rendering portion (17) to render the map (61).

The scale of the map displayed on the navigation device of the present embodiment is variable in 13 levels, as described above. For example, when the up key (67) is pressed while the map (61) around the guide point is displayed at the scale of 1:20000, the map (61) is then displayed at the scale of 1:10000 that is one-level larger. When the down key (69) is pressed while the map (61) is displayed at the scale of 1:20000, the map (61) is then displayed at the scale of 1:40000 that is one-level smaller. Note that when the up key (67) is pressed while the map (61) is displayed at a maximum scale, or when the down key (69) is pressed while the map (61) is displayed at a minimum scale, the control portion (1) disregards this operation and does not change the scale of the map (61) around the guide point.

In the case where the return key (65) is pressed instead of the up key (67) or the down key (69) while the map (61) around guide point is displayed, the control portion (1), after step S31, performs again the processing in step S7 onward, so that the guidance screen is displayed on the display portion (19). Also in the case where the guide point display key (49) has not been pressed after the guidance screen was displayed on the display portion (19) due to the execution of step S21, and the control portion (1) thus has determined that the guidance screen needs to be updated (S33), the processing in step S7 onward is performed again. In step S33, for example, the control portion (1) determines whether or not to update the guidance screen based on the travel distance of the vehicle or time elapsed after step S7. Note that the guide operation illustrated in FIGS. 7 and 8 ends, for example, in the case where the power of the navigation device is turned off since the vehicle has arrived the destination, or in the case where an instruction is given to end the operation via the menu screen called up as a result of the menu key (45) having been pressed.

Examples shown in FIGS. 2 to 6 are described with reference to the flowcharts in FIGS. 7 and 8. The set scale of the map set in the navigation device is assumed to be, for example, 1:10000. Also, a predetermined scale in step S13 is assumed to be, for example, 1:40000. In this case, since the set scale of 1:10000 is larger than the predetermined scale of 1:40000, determination in step S17 is made after step S13. When the guide point that the vehicle is to pass through next is not included in the map (41) of the guidance screen, steps S15 and S21 are performed, so that the guidance screen as shown in FIG. 2 is displayed, with the guide point display key (49) being activated. As a result of the guide point display key (49) having been pressed, steps S23 to S27 are performed, and the map (61) around the guide point as shown in FIG. 3 is displayed. In addition, when the up key (67) or the down key (69) is pressed, steps S25 and S27 are performed so that the map (61) whose scale has been changed through steps S25 and S27 is displayed. When it is determined in step S17 that the guide point that the vehicle is to pass through next is included in the map (41) of the guidance screen, steps S19 and S21 are performed so that the guidance screen (in which the guide point is indicated) as shown in FIG. 4 is displayed, with the guide point display key (49) being deactivated. For example, in the case where the set scale of the map is 1:160000, since the set scale of 1:160000 is smaller than the predetermined scale of 1:40000, steps S15 and S21 are performed after step S13, so that the guidance screen as shown in FIG. 5 is displayed, with the guide point display key (49) being activated. When the guide point display key (49) is pressed, steps S23 to S27 are executed so that the map (61) as shown in FIG. 6 is displayed.

As described above, with the navigation device of the present embodiment, the map data includes information for the maps of 13 scale levels, and one of the 13 scale levels may be selected as the scale of the map (41) of the guidance screen. However, setting a very small scale for the map (41) of the guidance screen is not preferable from the perspective of the function of the navigation device, namely, guiding the travel of the vehicle by presenting a guidance route. Therefore, with the navigation device of the present invention, a configuration is conceivable in which a lower limit is set on the scale of the map (41) of the guidance screen (for example, the scale of 1:20000 is set as the lower limit). In such a case, processing in steps S13 and S15 in the flowcharts shown in FIGS. 7 and 8 may be omitted. In other words, in such an embodiment, when the guide point is present on the map (41), regardless of the scale of the map (41) on the guidance screen, the guide point display key (49) is deactivated.

With the navigation device of the present embodiment, when the guide point display key (49) is pressed, the map (61) around the guide point is displayed instead of the guidance screen, although, for example, the map (61) around the guide point may be displayed on the guidance screen as a pop-up screen, or the guidance screen may be modified such that the map (61) around the guide point is displayed on a portion of the guidance screen (together with the map around the vehicle (41)). Note that it should be appreciated that the specific values of the scales given as examples in the above description, and specific values such as the distances (to the guide point) shown in the drawings are merely intended as examples for the purpose of elucidating the present invention.

The GPS receiver (9), gyroscope (11), speed sensor (13) and control portion (1) (including programs executed) correspond to the current position locating means of the present invention, the recording medium (25) corresponds to the storage means, the rendering portion (17), display portion (19) and control portion (1) (including programs executed and data used) correspond to the display means, and the touch panel (31), the touch panel control portion (33) and control portion (1) (including programs executed and data used) correspond to the operation means.

The description of the foregoing embodiments is for illustrating the present invention, and should not be understood as limiting the invention disclosed in the claims or as restricting the scope of the claims. The constituent elements of the present invention are not limited to the foregoing embodiments, and can, of course, be modified within the technical scope disclosed in the claims.

The invention claimed is:

1. A navigation device for guiding travel of a vehicle in accordance with a guidance route, comprising:
   current position locating means for locating a current position of the vehicle;
   storage means for storing map data;
   display means for displaying a guidance screen that includes a map around the current vehicle position with use of the map data; and
   operation means formed by a key displayed on the display means and a touch panel,
   wherein the guidance screen includes a guide point display key that causes a map around a guide point that the vehicle is to pass through next, out of guide points on the guidance route that are for guiding a travel direction of the vehicle, to be displayed on the display means, and
   the guide point display key has added thereto an arrow indicating the travel direction of the vehicle at the guide point that the vehicle is to pass through next so that guidance on the travel direction at the guide point is visually provided to a driver of the vehicle.

2. The navigation device according to claim 1, wherein in a case where the guide point that the vehicle is to pass through next is included in the map around the current vehicle position, the guide point display key is deactivated.

3. The navigation device according to claim 2,
   wherein a scale of the map around the current vehicle position can be selected from among a plurality of values, and
   in a case where the scale of the map around the current vehicle position is a predetermined value or smaller, the guide point display key is activated even if the guide point that the vehicle is to pass through next is included in the map around the current vehicle position.

4. The navigation device according to claim 3, wherein the map around the guide point that the vehicle is to pass through next includes two keys, the two keys constituting the operation means together with the touch panel, and one of the keys being for increasing the scale of the map, and the other being for decreasing the scale of the map.

5. The navigation device according to claim 1, wherein the map around the guide point that the vehicle is to pass through next includes two keys, the two keys constituting the operation means together with the touch panel, and one of the keys being for increasing the scale of the map, and the other being for decreasing the scale of the map.

* * * * *